E. A. BAILEY.
GONVERTIBLE PLOW.
APPLICATION FILED MAR. 8, 1918.

1,335,636. Patented Mar. 30, 1920.

WITNESSES
W. C. Fielding
H. G. Pierson

INVENTOR
Emery A. Bailey

BY Richard Bowen

ATTORNEY

UNITED STATES PATENT OFFICE.

EMERY A. BAILEY, OF CLINTON, MINNESOTA.

CONVERTIBLE PLOW.

1,335,636.   Specification of Letters Patent.   Patented Mar. 30, 1920.

Application filed March 8, 1918. Serial No. 221,207.

*To all whom it may concern:*

Be it known that I, EMERY A. BAILEY, a citizen of the United States, residing at Clinton, in the county of Bigstone and State of Minnesota, have invented certain new and useful Improvements in Convertible Plows, of which the following is a specification.

This invention is a convertible plow more particularly adapted for use in agricultural operations wherein the owner of a gang plow of the riding type may readily convert the gang plow into a single plow or vice versa, as required.

One object of the invention is to provide a riding plow with a removable false plow beam having its curved end shortened to avoid striking the ground.

Another object of the invention is to provide a sub-frame which consists of spaced plow beams with braces extending therebetween.

Still another object of the invention is to provide a bracket adjacent one corner of the main frame to provide for changing the rear furrow wheel when changing from a gang to a single plow and vice versa.

Broadly stated the invention comprises a main frame carried by suitable wheels including land and furrow wheels, the rear furrow wheel being movable to two positions by means of a bracket secured at one end of the frame, a sub-frame that consists of spaced plow beams connected by suitable braces, one of said plow beams being replaceable with a false plow beam when it is desired to convert a riding gang plow into a single plow and vice versa.

One practical form of construction and assembly will be described and illustrated in the accompanying drawings, in which:—

Figure 1:
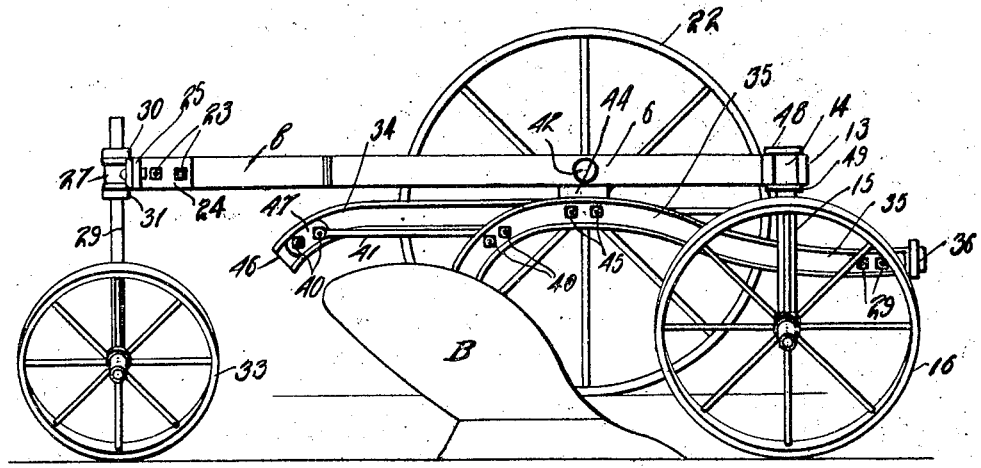
Figure 1 is a side elevation of the assembled plow.
Figure 2:
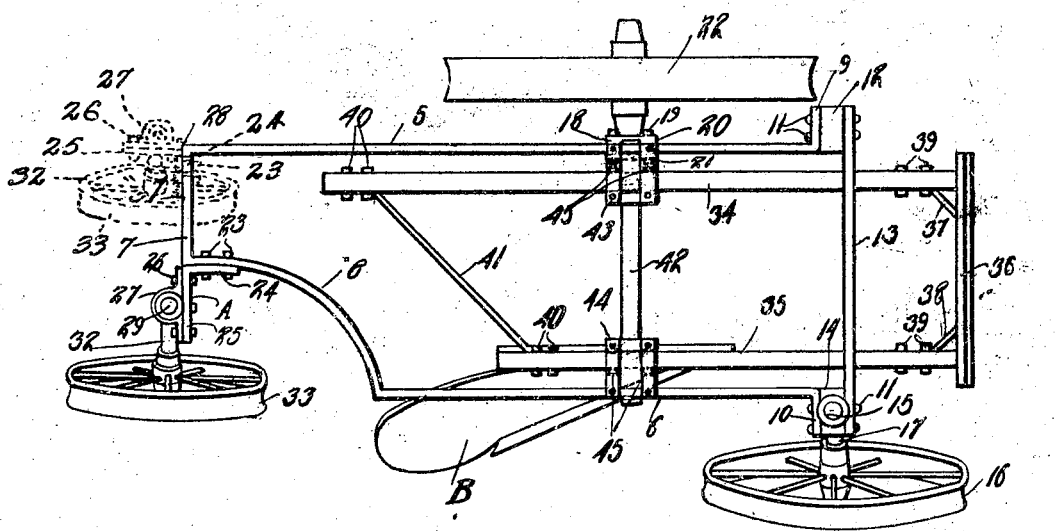
Fig. 2 is a top plan view of the plow shown in Fig. 1.

In the preferred embodiment about to be described, there is provided a main frame of approximately U-shape having the side members 5 and 6 connected by a transverse portion 7. As shown the frame is made of a continuous length of metal and the side member 6 is provided with an arcuate portion 8 at the end where it joins the transverse portion 7. The free ends of each of the members 5 and 6 are bent at right angles to form the flanges 9 and 10.

These flanges 9 and 10 are provided with suitable holes through which are adapted to pass the bolts 11. These bolts 11 pass through a spacing block 12 that is interposed between the flange 9 and the cross member 13. This cross member is also provided with holes so that the bolts may secure the cross member 13 with a spacing block 14 in position upon the flange 10.

The spacing block 14 serves as a bearing to accommodate the vertical shaft 15 that carries at its lower end the front furrow wheel 16. The shaft 15 projects downward a sufficient distance and has its lower ends bent angularly to provide an axle 17 on which is mounted the front furrow wheel 16.

The side member 5 of the main frame is provided at a suitable point with a bearing 18 that is secured to the side member by suitable fastening means such as the bolts 19. This bearing may be composed of the flanges 20 and 21 from which projects a stub axle carrying the land wheel 22.

The arcuate portion 8 is provided adjacent the transverse portion 7 with suitable holes through which are adapted to pass the bolts 23. These bolts 23 serve to hold in position an approximately L-shaped bracket A. The transverse member of this bracket indicated at 24 is curved to conform to the contour of the arcuate portion 8. This curved transverse portion 24 is also provided with suitable holes to register with the holes in the arcuate portion 8 so that the bolts 23 may hold the bracket firmly in position.

The limb 25 is also provided with suitable holes through which pass the bolts 26. These bolts are adapted to pass through registering holes in the bearing 27 to hold said bearing in position upon the limb 25. It will be noted that the outer surface of the limb 25 is in alinement with the outer surface of the transverse portion 7 of the main frame. In other words it is a continuation of this transverse portion 7 and serves to provide for placing the bearing 27 from its normal position adjacent the juncture of the side member 5, with the transverse portion 7.

The transverse member 7 is provided with suitable holes adjacent the corner 28 to provide for securing the bearing 27 in position thereto. The bearing 27 is so arranged that it serves to have the stem or shaft 29 pass therethrough to provide for rotary movement of the shaft in said bearing. In order to prevent vertical movement the shaft 29 is provided with the collars 30 and 31 that may be secured in position by any suitable means. As shown these collars 30 and 31 are secured upon the shaft 29 adjacent the outer ends of the bearing 27. This shaft 29 projects downwardly and is provided at its lower end with a portion bent at an angle to the shaft 29 as indicated at 32 to form a stub-axle upon which is carried the rear furrow wheel 33.

A sub-frame comprises the side members 34 and 35 that are joined together at their forward ends by means of the cross member 36. As shown the cross member 36 is partly held in position and braced by means of the braces 37 and 38. The braces 37 and 38 may be bolted to the cross member 36 and to the side members 34 and 35 by means of the bolts 39. To provide for the passing of the bolts 39 through the side members 34 and 35 they are provided with suitable holes to register with the holes formed in the braces 37 and 38.

The side member 34 is preferably longer than the side member 35 and is provided at its rear end with suitable holes through which are adapted to pass the bolts 40. In order to space and also brace the rear ends of the side members 34 and 35 in a substantial manner an approximately Z-shape brace 41 is employed.

This brace is provided with holes to register with the holes formed in the side member 34 so that the bolts 40 may pass through both the braces 41 and the side member 34 to hold the same firmly in position. The other end of the brace is provided with holes as is likewise the side member 34 and through these registering holes there are adapted to pass bolts 40 similar to the ones securing the brace to the side member 34.

The side members 34 and 35 are preferably formed of plow beams as shown more particularly in Fig. 1. The sub-frame may be mounted and secured to the main frame in any suitable manner. A shaft 42 extends through bearing plates 43 and 44 and through the main frame, said plates being connected with the sub-frame and with the main frame. Any usual construction may be employed for holding the sub-frame in position such as is commonly employed upon riding plows.

The side member 34 may be formed as a plow beam as shown in Fig. 1. The rear end to which is attached the plow is cut off just after it begins to curve downward as indicated at 46. Adjacent this end 46 the flanged end 47 of the brace 41 is secured by means of the bolts 40. This side member 34 serves as a false plow beam to give stiffness and rigidity to the sub-frame when using the plow as a single plow. The beam 34 is detached from beam 35 by removing the bolts which connect it to the braces and a beam carrying a gang plow (not shown) is substituted therefor.

The side member 35 is formed in the usual manner with the beam serving as the side member 35 and having connected at its rear end the plow generally indicated at B. When using the plow as a single plow as shown in the several figures the bearing 27 is secured in position upon the vertical portion 25 of the bracket A. This will cause the rear furrow wheel 33 to follow in its usual path or track behind the plow B.

When it is desired to employ the plow as a gang plow the false beam that serves as the side member 34, is removed and the usual plow beam and plow are secured in position in the place occupied by this false beam. The bearing 27 is unbolted from the bracket A and is moved over toward its position adjacent the corner 28 and is bolted in position upon the transverse portion 7. This will cause the rear furrow wheel 33 to track with the plow carried by the plow beam forming the side member 34. In order to maintain the front furrow wheel in a proper vertical position the shaft 15 may be provided with the collars 48 and 49 that are secured to the shaft in any suitable manner and upon opposite ends of the bearing 14. The offset spindle 29 which supports the rear furrow wheel 33 may be held in position in the usual manner, a rod 29' preferably connecting it with the front of the plow as shown at 29''.

As will be seen from the above description the riding plow may be readily converted from a gang plow into a single plow or from the single type into a gang plow. The change is accomplished by the removal of a few bolts so as to provide for the changing of the bearing 27 and for the substituting of a regular plow beam and plow for the false plow beam serving as the side member 34.

What is claimed is:

In a convertible plow a combination of a supporting frame having ground wheels and a rear furrow wheel, a sub-frame comprising parallel beams detachably connected together, one only of said beams carrying a plow and the other being removable to permit substitution of a plow carrying beam, and means for removably mounting the rear furrow wheel on the frame directly behind either of the beams.

In testimony whereof I affix my signature in presence of two witnesses.

EMERY A. BAILEY.

Witnesses:
S. P. STEEN,
E. F. HARRISON.